United States Patent Office 3,205,243
Patented Sept. 7, 1965

3,205,243
2-METHYLENE STEROIDS AND PREPARATION THEREOF
Moises Riano, East Greenbush, and Andrew John Manson, North Greenbush, N.Y., assignors to Sterling Drug Inc., New York, N.Y., a corporation of Delaware
No Drawing. Filed Nov. 7, 1963, Ser. No. 322,015
5 Claims. (Cl. 260—397.4)

This invention relates to novel unsaturated steroids and in particular resides in the concept of steroids of the 4-androstene series substituted by methylene in the 2-position, e.g., 2-methylene-4-androsten-17β-ol-3-one and esters thereof, including 17α-lower-alkyl and 17α-lower-alkynyl derivatives thereof. The invention is also concerned with methods for preparing these steroids, and intermediates in their preparation.

The compounds of the invention are of the formula

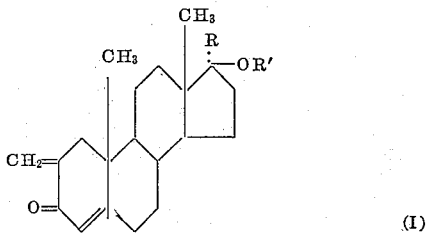

(I)

wherein R is hydrogen, lower-alkyl or lower-alkynyl; and R' is hydrogen or carboxylic acyl.

In the above formula, R, when lower-alkyl or lower-alkynyl, preferably has from one to about four carbon atoms and thus includes methyl, ethyl, propyl, isopropyl, butyl, ethynyl, 1-propynyl, 2-propynyl, 1-butynyl, and the like.

In the above formula, R', when carboxylic acyl, can be derived from any carboxylic acid conventionally employed in the steroid art having from one to about ten carbon atoms and having a molecular weight less than about 200. Representative of the acyl radical R' is lower-alkanoyl, e.g., formyl, acetyl, propionyl, butyryl, isobutyryl, caproyl, heptanoyl, octanoyl, trimethylacetyl, and the like; carboxy-lower-alkanoyl, e.g., succinyl (β-carboxypropionyl); cycloalkyl-lower-alkanoyl wherein cycloalkyl has 5–6 ring members, e.g., β-cyclopentylpropionyl, β-cyclohexylpropionyl, and the like; monocarbocyclic aroyl, e.g., benzoyl, p-toluyl, p-nitrobenzoyl, 3,4,5-trimethoxybenzoyl, p-chlorobenzoyl, and the like; monocarbocyclic aryl-lower-alkanoyl or -alkenoyl radicals, such as phenylacetyl, β-phenylphopionyl, cinnamoyl, and the like; and monocarbocyclic aryloxy-lower-alkanoyl radicals, such as p-chlorophenoxyacetyl, and the like. A preferred class of monocarbocyclic aryl includes phenyl and phenyl substituted by from one to three substituents selected from lower-alkyl of 1–4 carbon atoms, lower-alkoxy of 1–4 carbon atoms, nitro, and halogen, including fluorine, chlorine, bromine and iodine.

The compounds of the invention can be prepared by two general methods:

(1) By dehydration of the corresponding 2α-hydroxymethyl compounds.

A compound of the formula

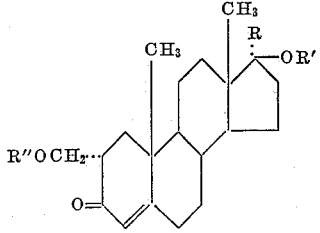

(II)

wherein R and R' have the same meanings given above and R" is hydrogen or carboxylic acyl, is treated with a base. In the case where R" is hydrogen, the elements of water are eliminated, and in the case where R" is carboxylic acyl, the elements of a carboxylic acid R"OH are eliminated, to yield a compound of Formula I. Only mild alkaline conditions, for example, potassium bicarbonate in methanol, are needed to effect dehydration, and in fact dehydration can be carried out without causing hydrolysis of an ester group at the 17-position.

A modification of the foregoing procedure comprises heating a compound of Formula II where R' and R" are hydrogen with an acid anhydride or acid halide, preferably at a temperature between about 50° C. and 150° C. in a high boiling tertiaryamine solvent, for example, pyridine or collidine. Dehydration takes place as well as esterification of the 17-hydroxy group to give a compound of Formula I where R' is carboxylic acyl. Esterification of the 17-hydroxy group when R is other than hydrogen requires a higher temperature and longer heating than in the case where R is hydrogen.

The starting materials of Formula II are prepared by microbiological reduction of the corresponding 2-hydroxymethylene-4-androsten-17β-ol-3-one compounds as described in the copending application of Nielson et al., Serial No. 322,029, filed November 7, 1963, now U.S. Patent 3,198,809.

(2) By deamination of a 2α-aminomethyl-17α-R-4-androsten-17β-ol-3-one, wherein R is hydrogen, lower-alkyl or lower-alkynl.

The 2α-aminomethyl group can be unsubstituted aminomethyl ($H_2NCH_2$), or one or both hydrogen atoms of the amino group can be substituted by organic radicals. Since the amine moiety is removed in the deamination process, its exact nature is not critical and it can be derived from any amine which will participate in the Mannich reaction used to produce the 2α-aminomethyl intermediates. Exemplary of preferred types of amine moieties are amino, lower-alkylamino, di-lower-alkylamino, piperidino, morpholino and pyroolidino.

Examples of deaminating agents are activated magnesium silicate and bases such as sodium hydroxide, potassium hydroxide, sodium carbonate, sodium methoxide, and the like.

Amine elimination can also be effected by steam distillation or pyrolysis of an acid-addition salt of the 2α-aminomethyl steriod. In some instances the deamination occurs in the same reaction medium in which the 2α aminomethyl steroid is formed.

The intermediate 2α-aminomethyl- 17α-R-4-androsten-17β-ol-3-ones are prepared as follows:

(a) By a Mannich reaction employing a 17α-R-4-androsten-17β-ol-3-one, formaldehyde and an amine. Frequently, the intermediate 2α-aminomethyl-17α-R-4-androsten-17β-ol-3-one is not isolated but undergoes deamination in the same reaction medium to produce a 2-methylene compound of Formula I.

(b) By reduction of a 2α-cyano steroid:

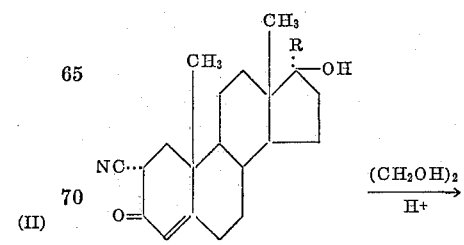

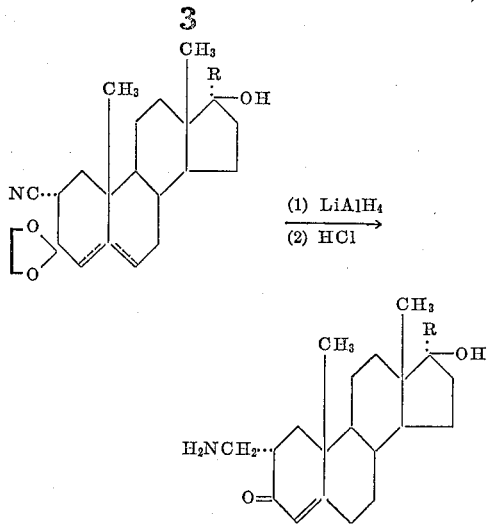

A 2α-cyano-17α-R-4-androsten-17β-ol-3-one is converted to its 3-ethylene glycol ketal, the double bond either remaining in the 4-position or shifting to the 5-position. The ketal is then reduced with lithium aluminum hydride and cleaved with acid to produce 2α-aminomethyl-17α-R-4-androsten-17β-ol-3-one.

The structures of the compounds of the invention were established by elementary analysis, and by ultraviolet, infrared and NMR spectral studies.

Endocrinological evaluation of the compounds of Formula I has shown that they possess anabolic properties, exhibiting nitrogen retention and myotrophic activity with relatively little androgenic activity. The compounds are active both upon subcutaneous and oral administration.

The following examples will further illustrate the invention without the latter being limited thereby.

*Example 1.—17β-acetoxy-2-methylene-4-androsten-3-one*

To a solution of 2.9 g. of 2α-acetoxymethyl-4-androsten-17β-ol-3-one 17-acetate in 400 ml. of 80% aqueous methanol, 6 g. of KHCO$_3$ was added. The suspension was stirred on a steam bath until solution was complete (0.5 hr.). The clear reaction mixture was kept at room temperature (25° C.) for sixteen hours. The solution was then evaporated under reduced pressure to small volume and a colorless material precipitated out. Distilled water (500 ml.) was added and the precipitated material separated by filtration, washed with water and dried, giving 2.3 g., M.P. 172–180° C. A portion of this material (1.3 g.) was chromatographed over 150 g. of activated magnesium silicate. The column was developed with approximately 100–125 ml. portions of solvents of the following composition: ether (6 portions); ether-benzene (9:1) (21 portions); ether-benzene (17:3) (19 portions); ether-benzene (3:1) (9 portions); and ether-benzene (1:1) (7 portions). All fractions were analyzed by thin layer chromatography. Fractions eluted by ether-benzene (9:1) and ether-benzene (17:3) were combined and the solvent evaporated, leaving 0.70 g. of crystalline 17β-acetoxy-2-methylene-4-androsten-3-one. Recrystallization from methanol afforded pure material in the form of colorless rods, M.P. 194–196° C. (corr.), $[\alpha]_D^{25}=+132.15°$ (0.51% in chloroform); ultraviolet maximum at 259–260 mμ ($\epsilon=14,200$); infrared absorption at 3.41, 3.51, 5.76, 6.00, 6.17, 6.88, 6.95 and 8.00μ. The NMR spectrum was also in accord with the assigned structure.

*Example 2.—17β-(β-cyclohexylpropionoxy)-2-methylene-4-androsten-3-one*

2α-hydroxymethyl-4-androsten-17β-ol-3-one (7.24 g.) was dissolved in 100 ml. of pyridine, previously dried over potassium hydroxide. β-cyclohexylpropionic anhydride (15 ml.) was then added and the mixture was stirred for four hours at 60° C., for four hours at 80° C., and allowed to stand at room temperature overnight. The reaction mixture was concentrated to a syrup, diluted with ether, washed with dilute sodium bicarbonate solution, dried over anhydrous sodium sulfate and concentrated to dryness. The residue was dissolved in cyclohexane and chromatographed on a column of 700 g. of silica gel. The column was eluted with pentane and with pentane containing gradually increasing amounts of ether. Pentane-ether 4:1 brought out one product which was recrystallized from ether and from ethyl acetate to give 17β - (β - cyclohexylpropionoxy)-2-methylene-4-androsten-3-one in the form of colorless plates, M.P. 150.0–151.2° C. (corr.), $[\alpha]_D^{25}=+121.9°$ (1% in chloroform); ultraviolet maximum at 260 mμ ($\epsilon=14,600$); infrared absorption at 3.42, 3.50, 5.75, 6.01, 6.20, and 8.55μ.

Further elution of the chromatograph column with pentane-ether 1:1 brought out another product, unesterified at C–17, which was recrystallized from ether to give 2-methylene-4-androsten-17β-ol-3-one, M.P. 136–142° C. (uncorr.); infrared absorption at 3.00, 3.40, 3.50, 5.74, 5.99, 6.16 and 6.21μ.

*Example 3.—17β-(β-phenylpropionoxy)-2-methylene-4-androsten-3-one*

A mixture of 0.50 g. of 2α-hydroxymethyl-4-androsten-17β-ol-3-one, 0.662 g. of β-phenylpropionyl chloride and 1.0 ml. of pyridine was heated until solution was complete. The product was isolated and chromatographed on silica gel to give 17β-(β-phenylpropionoxy)-2-methylene-4-androsten-3-one, M.P. 95–130° C. (uncorr.); ultraviolet maxima at 225 and 259 mμ ($\epsilon=6100, 11,900$).

2-methylene-4-androsten-17β-ol-3-one can be caused to react with caproyl chloride, benzoyl chloride, p-toluyl chloride, p-nitrobenzoyl chloride, 3,4,5-trimethoxybenzoyl chloride, β-cyclopentylpropionic anhydride, phenylacetyl chloride, cinnamoyl chloride, or p-chlorophenoxyacetyl chloride, in the presence of pyridine, to give, respectively, 17β-capryloxy-2-methylene-4-androsten-3-one,
17β-benzoyloxy-2-methylene-4-androsten-3-one,
17β-(p-toluyloxy)-2-methylene-4-androsten-3-one,
17β-(p-nitrobenzoyloxy)-2-methylene-4-androsten-3-one,
17β-(3,4,5-trimethoxybenzoyloxy)-2-methylene-4-androsten-3-one,
17β-(β-cyclopentylpropionoxy)-2-methylene-4-androsten-3-one,
17β-phenylacetoxy-2-methylene-4-androsten-3-one,
17β-cinnamoyloxy-2-methylene-4-androsten-3-one, or
17β-(p-chlorophenoxyacetoxy)-2-methylene-4-androsten-3-one.

*Example 4*

2-methylene-17α-methyl - 4 - androsten-17β-ol-3-one was prepared by treating 2α-acetoxymethyl-17α-methyl-4-androsten-17β-ol-3-one with potassium bicarbonate in methanol according to the procedure described above in Example 1. There was thus obtained 2-methylene-17α-methyl-4-androsten-17β-ol-3-one, M.P. 189–193° C. (uncorr.), $[\alpha]_D^{25}=+141.4°$ (0.58% in chloroform); ultraviolet maximum at 260 mμ ($\epsilon=14,000$); infrared absorption at 2.93, 6.05 and 6.20μ. The NMR spectrum was in accord with the assigned structure.

*Example 5.—2-methylene-17α-ethynyl-4-androsten-17β-ol-3-one*

17α-ethynyl-4-androsten-17β-ol-3-one (24.0 g.) was suspended in 500 ml. of glacial acetic acid in a nitrogen atmosphere. Formaldehyde (12.0 ml. 40%) was added, the mixture heated to 80° C. and then 12.0 g. of dimethylamine hydrochloride added. The reaction mixture was heated for three hours at boiling temperature, left overnight at room temperature and poured into ice-water. The mixture was filtered to remove unreacted starting material, and the filtrate was made alkaline with potassium bicarbonate and extracted with methylene dichloride. The extracts were dried over anhydrous sodium sulfate and concentrated, and the residue was dissolved in 500 ml. of methylene dichloride, stirred eighteen hours with 100 g. of activated magnesium silicate and poured onto a column of 400 g. of activated magnesium silicate. The column was eluted with methylene dichloride and with methylene dichloride-ether 1:1. The material brought out by the latter eluant was rechromatographed on 300 g. of activated magnesium silicate and eluted with benzene and benzene containing increasing amounts of ether. Benzene-ether 9:1 brought out the desired product which was recrystallized several times from acetone-hexane to give 2-methylene - 17α - ethynyl-4-androsten-17β-ol-3-one, M.P. 180.6–181.8° C. (corr.), $[\alpha]_D^{25}=+73.5°$ (1% in chloroform); ultraviolet maximum at 260 mμ ($\epsilon$=13,900); infrared maxima at 2.90, 3.06, 3.41, 4.75, 5.28, 6.00, 6.15 and 6.95μ. The nuclear magnetic resonance spectrum confirmed the presence of the groupings =$CH_2$, ≡CH and angular $CH_3$.

The same results can be obtained by replacing the dimethylamine hydrochloride in the foregoing preparation by a molar equivalent amount of dibutylamine hydrochloride, ethylamine hydrochloride, piperidine hydrochloride, pyrrolidine hydrochloride, morpholine hydrochloride, or 4-methylpiperidine hydrochloride.

*Example 6*

2-methylene-17α-ethynyl-4-androsten-17β-ol-3-one was prepared by treating 2α-acetoxymethyl-17α-ethynyl-4-androsten-17β-ol-3-one with potassium carbonate according to the procedure described above in Example 1. The product was identical with that obtained in Example 5.

*Example 7*

(a) *2α - cyano - 3 - ethylenedioxy-4-androsten-17β-ol.*—2α-cyano-4-androsten-17β-ol-3-one (1.00 g.) was dissolved in 125 ml. of benzene and the solution refluxed under a water trap for 30 minutes to remove traces of water. Freshly distilled ethylene glycol (10 ml.) and 0.05 g. of sulfosalicylic acid were added, and the mixture was refluxed under a water trap for two and one-half hours. Water (100 ml.) was added to the reaction mixture, and the benzene layer was separated, washed with 5% sodium bicarbonate solution and saturated sodium chloride solution, dried over anhydrous sodium sulfate and concentrated. The residue was crystallized from ethyl acetate to give 2α-cyano-3-ethylenedioxy-4-androsten-17β-ol, M.P. 235–239.2° C. (corr.), $[\alpha]_D^{25}=+100.1°$ (1% in chloroform).

(b) *2α - (aminomethyl) - 4-androsten-17β-ol-3-one.*— A solution of 4.80 g. of 2α-cyano-3-ethylenedioxy-4-androsten-17β-ol in 50 ml. of tetrahydrofuran was added dropwise to a suspension of lithium aluminum hydride in 500 ml. of ether in a nitrogen atmosphere. The reaction mixture was stirred for three hours, and then 6 ml. of water in 12 ml. of tetrahydrofuran was added dropwise and the mixture stirred for thirty minutes longer. The mixture was filtered and concentrated to dryness. The residue was dissolved in methylene dichloride and excess ethereal hydrogen chloride was added. The product which separated was collected, recrystallized from methanol-ether and from methanol-ethyl acetate and dried for twelve hours at 85° C. in vacuo to give 2α-(aminomethyl)-4-androsten-17β-ol-3-one in the form of its hydrochloride salt, M.P. 283.2–291.2° C. (corr.), $[\alpha]_D^{25}=+86.6°$ (1% in 95% ethanol); ultraviolet maximum at 242 mμ ($\epsilon$=13,400); infrared absorption at 2.94, 3.42, 5.99, 6.19, 6.25, 6.33, 6.56 and 6.78–6.96μ.

2α-(aminomethyl)-4-androsten-17β-ol-3-one can be converted to 2-methylene-4-androsten-17β-ol-3-one by treating it with a deaminating agent such as activated magnesium silicate or sodium methoxide, or by pyrolytic methods.

We claim:

1. The process for preparing a 2-methylene steroid which comprises heating under alkaline conditions a compound of the formula

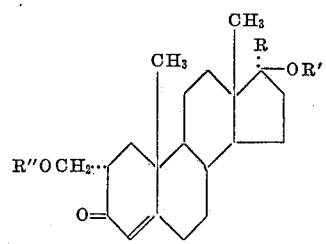

wherein R is a member of the group consisting of hydrogen, lower-alkyl and lower-alkynyl; and R' and R" are members of the group consisting of hydrogen and carboxylic acyl having from one to ten carbon atoms and a molecular weight less than about 200.

2. The process for preparing a 2-methylene steroid which comprises heating with a member of the group consisting of an acid anhydride and an acid halide in a high boiling tertiary-amine solvent at a temperature between about 50° C. and 150° C. a compound of the formula

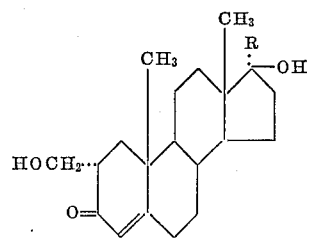

wheren R is a member of the group consisting of hydrogen, lower-alkyl and lower-alkynyl.

3. The process for preparing a compound of the formula

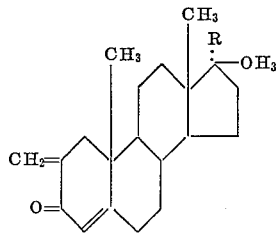

which comprises subjecting a compound of the formula

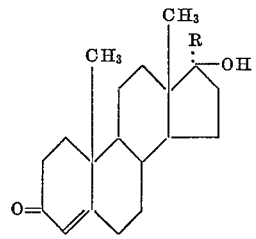

to a Mannich reaction with an amine and formaldehyde and treating the resulting 2α-aminomethyl-17α-R-4-androsten-17β-ol-3-one with a member of the group consisting of activated magnesium silicate, alkali metal hydroxides, alkali metal carbonates, and alkali metal lower-alkoxides; wherein R is a member of the group consisting of hydrogen, lower-alkyl and lower-alkynyl.

4. The process for preparing a compound of the formula

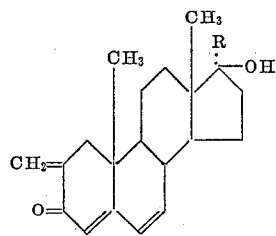

which comprises heating an acid-addition salt of a 2α-aminomethyl-17α-R-4-androsten-17β-ol-3-one, wherein R is a member of the group consisting of hydrogen, lower-alkyl and lower-alkynyl.

5. The process for preparing a compound of the formula

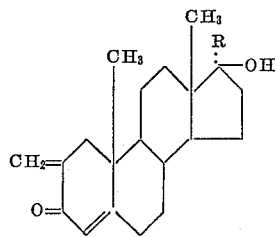

which comprises treating a 2α-aminomethyl-17α-R-4-androsten-17β-ol-3-one, wherein R is a member of the group consisting of hydrogen, lower-alkyl and lower-alkynyl, with a member of the group consisting of activated magnesium silicate, alkali metal hydroxides, alkali metal carbonates, and alkali metal lower-alkoxides.

References Cited by the Examiner

UNITED STATES PATENTS

| | | | |
|---|---|---|---|
| 3,033,854 | 5/62 | Eschenmoser | 260—239.5 |
| 3,092,621 | 6/63 | De Stevens | 260—239.5 |
| 3,152,153 | 10/64 | Evans et al. | 260—397.4 |

OTHER REFERENCES

Dorfman et al., Steroids, vol. 1, pp. 185–209, p. 196 relied on, February 1963.

Edwards et al., Journal Med. Chem., vol. 6, pp. 178—182, March 1963.

LEWIS GOTTS, *Primary Examiner.*

UNITED STATES PATENT OFFICE
CERTIFICATE OF CORRECTION

Patent No. 3,205,243                          September 7, 1965

Moises Riano et al.

It is hereby certified that error appears in the above numbered patent requiring correction and that the said Letters Patent should read as corrected below.

Column 6, lines 45 to 54, the upper right-hand portion of the formula should appear as shown below instead of as in the patent:

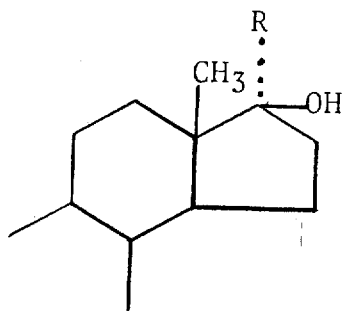

column 7, lines 3 to 12, the lower left-hand portion of the formula should appear as shown below instead of as in the patent:

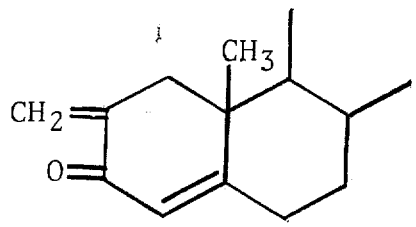

Signed and sealed this 11th day of October 1966.

(SEAL)
Attest:

ERNEST W. SWIDER
Attesting Officer

EDWARD J. BRENNER
                                               Commissioner of Patents